United States Patent [19]

Hatori et al.

[11] Patent Number: 4,520,777
[45] Date of Patent: Jun. 4, 1985

[54] SYSTEM FOR STABILIZING IDLING OF VEHICULAR ENGINE

[75] Inventors: Yukiyoshi Hatori; Eiji Yagi; Yuji Kobari, all of Yokosuka, Japan

[73] Assignee: Nissan Motor Co., Ltd., Yokohama, Japan

[21] Appl. No.: 445,558

[22] Filed: Nov. 30, 1982

[30] Foreign Application Priority Data

Dec. 15, 1981 [JP] Japan ................................ 56-202316

[51] Int. Cl.³ .............................................. F02M 3/00
[52] U.S. Cl. ...................................... 123/339; 180/142
[58] Field of Search ................ 123/339, 585; 180/141, 180/142, 143, 69.3

[56] References Cited

U.S. PATENT DOCUMENTS

| | | | |
|---|---|---|---|
| 3,146,844 | 9/1964 | Carlson | 180/335 |
| 3,146,845 | 9/1964 | Carlson | 180/335 |
| 4,225,003 | 9/1980 | Yoshimura | 180/54 G |
| 4,321,900 | 3/1982 | Takeda | 123/339 |
| 4,392,540 | 7/1983 | Michio et al. | 180/142 |
| 4,417,640 | 11/1983 | Abe et al. | 180/142 |

FOREIGN PATENT DOCUMENTS 2017599 10/1979 United Kingdom .

Primary Examiner—Parshotam S. Lall
Assistant Examiner—W. R. Wolfe
Attorney, Agent, or Firm—Schwartz, Jeffery, Schwaab, Mack, Blumenthal & Evans

[57] ABSTRACT

A vehicular power steering system has on/off control means for controlling a hydraulic fluid pump in accordance with steering effort applied on a steering wheel. On the other hand, a sensing means senses vehicle speed. Judging means is connected with the on/off control means and the vehicle speed sensing means, and produces an actuating signal when the control means produces a control signal to drive the fluid pump and at the same time the sensed vehicle speed is below a predetermined speed. A solenoid valve is connected with the judging means. The solenoid valve is arranged to open and close a bypass passage which allows an air fuel mixture to bypass a throttle valve for an intake air flow control of the engine. Thus, the supply of an air fuel mixture to the engine is increased in response to the actuating signal, and the engine idling speed is stabilized.

6 Claims, 2 Drawing Figures

SYSTEM FOR STABILIZING IDLING OF VEHICULAR ENGINE

BACKGROUND OF THE INVENTION

The present invention relates to a system for stabilizing idling operation of a vehicular engine by increasing an air fuel mixture supply to the engine when engine load is increased especially by a power steering system.

In order to save energy, a recent vehicular power steering system is often equipped with a control circuit for producing an on/off control signal. Such an on/off control signal is sent to a hydraulic fluid pump of the power steering system, and the fluid pump is controlled in an on/off control manner in accordance with steering effort applied on a steering wheel of the vehicle, angular velocity of a steering wheel movement, or other variables indicative of steering conditions.

SUMMARY OF THE INVENTION

It is an object of the present invention to provide a system for stabilizing idling operation of a vehicular engine which is fitted to a power steering system having an on/off control circuit.

According to the present invention, there are provided, in a system for stabilizing idling operation of a vehicular engine, a power steering system comprising a hydraulic power unit for providing power assistance to the steering system of the vehicle, a hydraulic fluid pump for supplying a hydraulic fluid under pressure to the power unit, sensing means for sensing at least one variable indicating steering conditions of the vehicle, and controlling means connected with the sensing means for generating a driving signal to control the fluid pump in an on/off control manner in accordance with the variable sensed by the sensing means, and low speed detecting means for generating a low speed signal when a vehicle speed is below a predetermined speed. The controlling means of the power steering system and the low speed detecting means are connected with judging means which generates an actuating signal when both of the driving signal of the controlling means and the low speed signal of the low speed detecting means are present. The judging means is connected with engine rotational speed adjusting means which increases the supply of an air fuel mixture to the engine by a predetermined amount when the actuating signal is generated by the judging means. Preferably, the engine rotational speed adjusting means comprises a bypass passage means for allowing an air fuel mixture to bypass a throttle valve for an intake air flow control of the engine, and a valve disposed in the bypass passage for opening and closing the bypass passage.

DETAILED DESCRIPTION OF THE INVENTION

Figure 1:
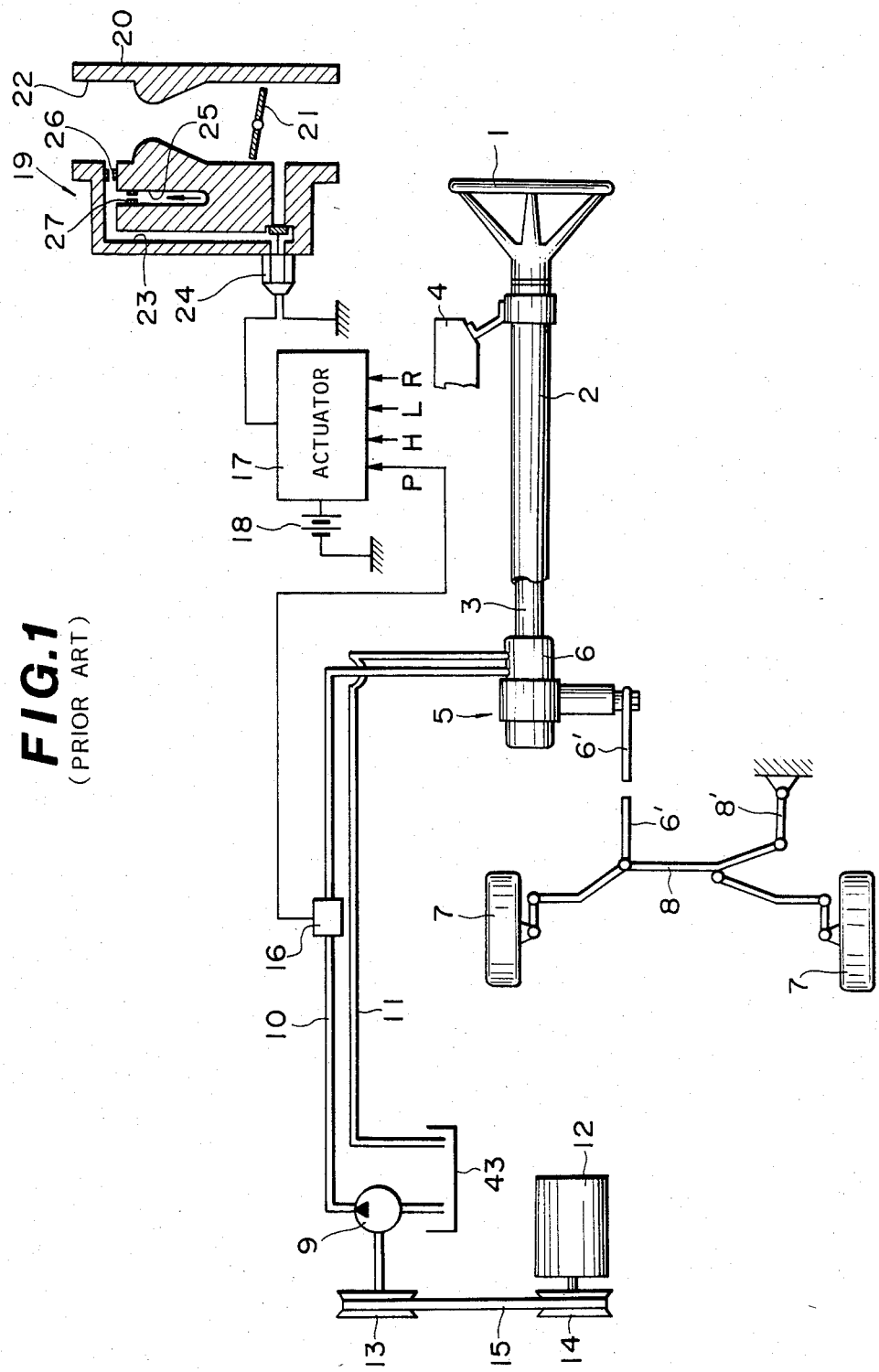
FIG. 1 is a schematic illustration showing a conventional system for stabilizing idling operation of a vehicular engine.

In a conventional system shown in FIG. 1, there are a steering wheel 1, a steering column 2, a steering shaft 3 fitted in the steering column 2, and an instrument panel 4 to which the steering column 2 is fixed. An integral type power steering unit 5 is constructed with a control valve and a power cylinder which are built in a steering gear box 6. A pitman arm 6' connects the steering gear to a steering linkage 8 which is arranged between right and left steerable road wheels 7. An idler arm 8' connects the steering linkage 8 to a vehicle body. A pump 9 for supplying a hydraulic fluid, such as oil, under pressure to the power steering unit 5 is connected, through a supply conduit pipe 10 and a return conduit pipe 11, with the power steering unit 5 in the steering gear box 6. Power steering fluid under pressure flows from the pump 9 through the supply conduit pipe 10 to the power steering unit 5, and returns through the return conduit pipe 11 to a reservoir 43. An oil pressure switch 16 is disposed in the supply conduit pipe 10. The oil pressure switch 16 produces an electric signal P when the fluid pressure within the supply conduit pipe 10 exceeds a predetermined value. The pump 9 is driven by an engine 12 of the vehicle. A pulley 13 on the pump side is connected with a pulley 14 on the engine side by a belt 14.

There is further provided an actuator circuit 17. The actuator circuit 17 is connected with one terminal of an electric source 18, the other terminal of which is grounded. The actuator circuit 17 sends a current to a solenoid valve 24 to energize it in accordance with various input signals. The input signals are the signal P produced by the oil pressure switch 16, a signal H which is produced when a heater fan (not shown) comes into operation, a signal L which is produced when lamps are switched on, and a signal R which is produced when a cooling fan in an engine cooling system is operated. The actuator circuit 17 supplies a current to the solenoid valve 24 when it receives any one of the input signals P, H, L and R.

A reference numeral 19 represents a carburetor for the engine 12. In a housing 20 of the carburetor 19, there are formed an intake air passage 22 and a bypass passage 23. The intake air passage 22 communicates with an intake manifold, and has therein a throttle valve 21. The bypass passage 23 bypasses the throttle valve 21. The solenoid valve 24 is disposed in this bypass passage 23. The solenoid valve 24 normally closes the bypass passage 23. When the actuator circuit 17 supplies a current to the solenoid valve 24, the solenoid valve 24 opens the bypass passage 23. A reference numeral 25 denotes a fuel supply passage. Orifices 26 and 27 are disposed in the bypass passage 23 and the fuel supply passage 25, respectively.

In this system, the engine idle speed under normal conditions is set at a low rpm in order to reduce fuel consumption. When engine load increases, such as when the heater fan, the lamps, the cooling fan, or the power steering system is brought into operation, the idle speed is increased by a predetermined amount (100-200 rpm) or kept unchanged by opening the bypass passage 23 so that a smooth and stable idling operation is maintained.

Figure 2:
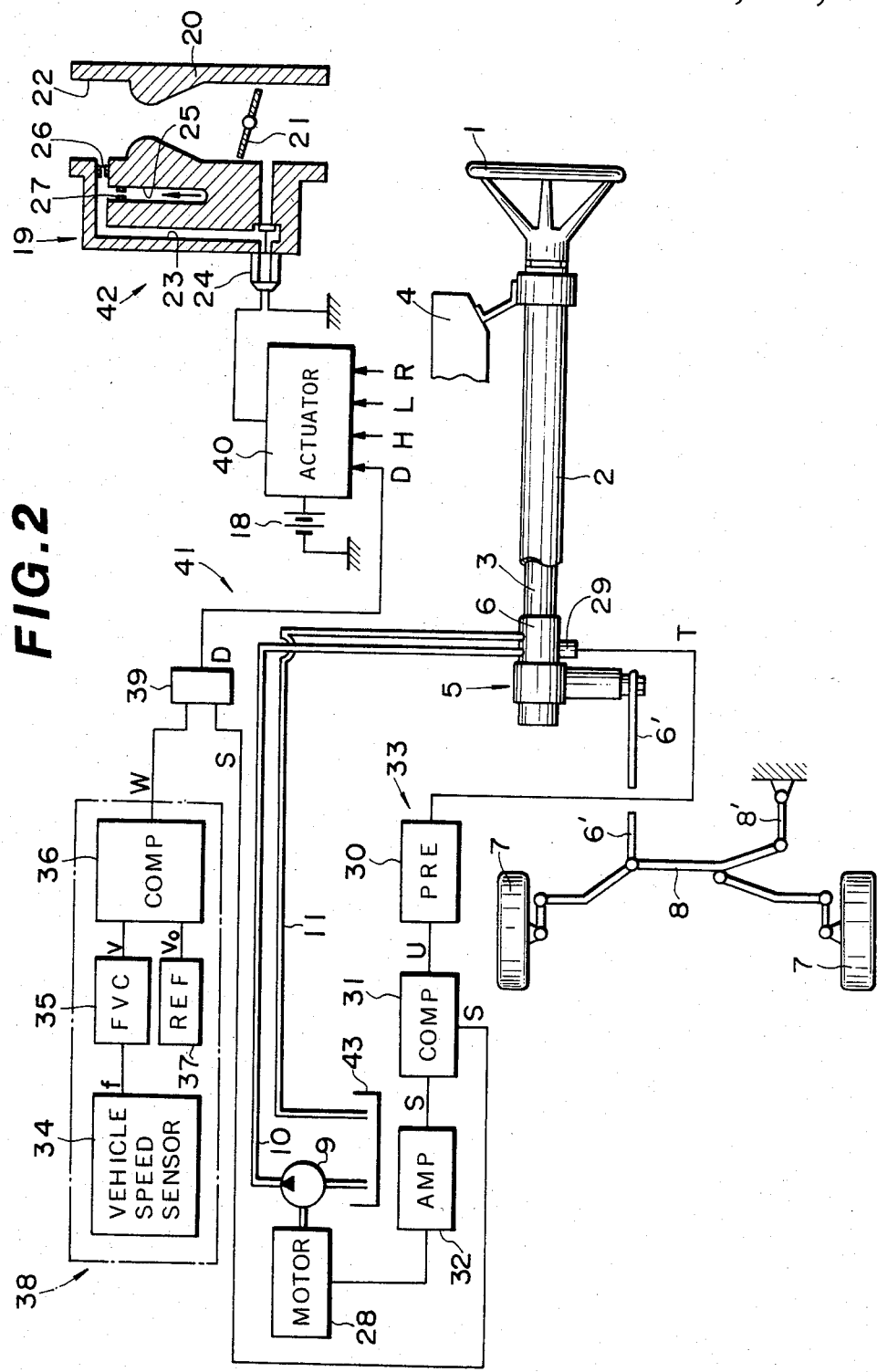
FIG. 2 is a schematic illustration showing a system for stabilizing idling operation of a vehicular engine according to the present invention.

In contrast with this conventional system, one embodiment of the present invention is shown in FIG. 2.

In this system, there are a steering wheel 1, a steering column 2, and a steering shaft 3 fitted in the steering column 2. The steering column 2 is attached to an instrument panel 4. The steering wheel 1 is connected by the steering shaft 3 to a steering gear box 6. An integral type power steering unit 5 composed of a control valve and a power piston is built in the steering gear box 6.

The steering gear box 6 is connected by a pitman arm 6' to a steering linkage 8 which is disposed between right and left steerable road wheels 7. The steering linkage 8 is connected to a vehicle body by an idler arm 8'. The power steering unit 5 is connected with a pump 9 by a supply conduit 10 and a return conduit 11. A hydraulic fluid under pressure flows from the pump 9 through the supply conduit 10 to the power steering unit 5, and returns from the power steering unit 5 to a reservoir 43. The pump 9 is driven by an electric motor 28. The motor 28 is controlled by controlling means 33 in a manner of an on/off control.

There is provided, in the power steering unit 5, means 29 for sensing steering effort. For example, the steering effort sensing means 29 senses the torsional angle of a torsion bar thereby to know steering effort. The steering effort sensing means 29 is connected with a preliminary circuit 30, which amplifies an output signal T of the steering effort sensing means 29. The output of the preliminary circuit 30 is connected to a comparator circuit 31. The comparator circuit 31 compares an output signal U of the preliminary circuit 30 with a predetermined reference signal Uo which corresponds to a predetermined steering effort level, and produces a driving signal S when the signal U is equal to or greater than the reference signal Uo. The driving signal S is sent to an amplifier circuit 32 and judging means 41. The amplifier circuit 32 amplifies the driving signal S when it is inputted, and supplies a current to the motor. Thus, the preliminary circuit 30, the comparator circuit 31 and the amplifier circuit 32 constitute the controlling means 33 for performing an on/off control of the electric motor 28.

A reference numeral 34 denotes a vehicle speed sensor. The vehicle speed sensor 34 sends a signal f having a frequency proportional to vehicle speed, to a frequency-to-voltage converter 35. The frequency-to-voltage converter 35 converts the output signal f of the vehicle speed sensor 34 to a signal v having a voltage corresponding to the frequency of the signal f. The signal v is sent to one input of a comparator circuit 36. A reference voltage supplier 37 produces a reference voltage signal vo which corresponds to a predetermined vehicle speed. The reference voltage signal is sent to the other input of the comparator 36. The comparator circuit 36 compares the signal v of the frequency-to-voltage converter 35 with the reference voltage signal vo. The comparator circuit 36 produces a low speed signal w when the signal v is equal to or smaller than the reference voltage signal vo. The vehicle speed sensor 34, the frequency-to-voltage converter 35, the reference voltage supplier 37 and the comparator circuit 36 constitute means 38 for detecting a low speed travel of the vehicle.

A reference numeral 39 denotes an AND gate circuit, which is connected with the comparator circuit 31 of the controlling means 33 and the comparator circuit 36 of the low speed travel detecting means 38. The AND gate circuit 39 is connected to an actuator circuit 40. The AND gate circuit 39 and the actuator circuit 40 constitute judging means 41. The AND gate circuit 39 produces an actuating signal D only when it receives both the driving signal S of the controlling means 33 and the low speed signal W of the low speed travel detecting means 38. The actuator circuit 40 is further connected with engine load detecting means (not shown). The engine load detecting means detects operations of a heater fan, lamps, a cooling fan, etc. and produces a signal H when the heater fan is brought into operation, a signal L when the lamps are switched on, and a signal R when the cooling fan is operated. The actuator circuit 40 is connected with one terminal of a power source 18, and the other terminal of the power source 18 is grounded. The actuator circuit 40 is also connected with a solenoid valve 24. The actuator circuit 40 makes the connection between the power source 18 and the solenoid valve 24 when it receives one of the signals D, H, L, R.

A reference numeral 19 denotes a carburetor for an engine (not shown) of the vehicle. In a housing 20 of the carburetor 19, there are formed an intake air passage 22 and a bypass passage 23. The intake air passage 22 communicates with an intake manifold and has therein a throttle valve 21. The bypass passage 23 bypasses the throttle valve 21. The throttle valve 21 is linked with an accelerator pedal in a known manner. There is disposed, in the bypass passage 23, the solenoid valve 24 which normally holds the bypass passage 23 in its closed state. One terminal of the solenoid valve 24 is grounded, and the other terminal is connected with judging means 41. The solenoid valve 24 opens the bypass passage 23 when it is supplied with energizing current from the judging means 41. Thus, the bypass passage 23 and the solenoid valve 24 constitute means 42 for adjusting engine rpm. A reference numeral 25 denotes a fuel supply passage. Orifices 26 and 27 are disposed in the bypass passage 23 and the fuel supply passage 25, respectively.

The operation of this system is as follows:

The pump 9 for the power steering unit 5 is controlled in an on/off control mode in accordance with steering conditions of the vehicle. In this embodiment, the on/off control is performed in accordance with steering effort applied on the steering wheel 1. That is, the pump 9 is driven when the driver applies a steering effort exceeding a predetermined level. In this control system, the steering effort sensing means 29 sends the signal T indicative of a steering effort applied on the steering wheel 1, to the comparator circuit 31 through the preliminary circuit 30. The comparator circuit 31 compares the signal U which is the output signal of the preliminary circuit and is indicative of steering effort, with the signal Uo corresponding to a predetermined steering effort. If the signal U is equal to or greater than the signal Uo, the comparator circuit 31 sends the driving signal S to the amplifier circuit 32 and to the AND gate circuit 39. Upon receipt of the driving signal S, the amplifier circuit 32 supplies power to the motor 28, so that the pump 9 is driven and the power steering unit 5 comes into operation.

On the other hand, vehicle speed is sensed by the vehicle speed sensor 34, which sends the signal f having a frequency indicative of the sensed vehicle speed, to the frequency-to-voltage converter 35. The frequency-to-voltage converter 35 converts the signal f to the voltage signal v having a voltage corresponding to the frequency of the signal f, and sends the voltage signal v to the comparator circuit 36. The comparator circuit 36 compares the voltage signal v with the reference voltage signal vo which is supplied from the reference voltage supplier 38 and corresponds to the predetermined vehicle speed. If the voltage signal v is equal to or smaller than the reference voltage signal vo, the comparator circuit 36 produces the low speed signal w.

When the vehicle is travelling below the predetermined speed or the vehicle is at rest, the comparator circuit 36 of the low speed travel detecting means 38 sends the low speed signal w to the AND gate circuit 39. If, in this state, the driver turns the steering wheel 1 with a steering effort exceeding the predetermined level, the AND gate circuit 39 further receives the driving signal S which is sent from the comparator circuit 31 of the controlling means 33. Receiving the low speed signal and the driving signal S, the AND gate circuit 39 sends the actuating signal D to the actuator circuit 40. Upon receipt of the actuating signal, the actuator circuit 40 supplies an energizing current to the solenoid valve 24 by connecting the power source to the solenoid valve 24. Supplied with the exciting current, the solenoid valve 24 opens the bypass passage 23 and allows an air fuel mixture to pass through the bypass passage. As a result, the engine rpm is increased or prevented from being decreased. In this way, the engine rpm is stabilized and the operation of the power steering unit 5 is ensured.

Even if the vehicle is travelling at low speed or not moving, the actuator circuit 40 does not receive any of the input signals D, H, L and R if all the power steering unit 5, the heater fan, the light, and the cooling fan are not in operation. In this case, the bypass passage 23 remains closed by the solenoid valve 24, so that fuel consumption is reduced.

When the vehicle is travelling at speeds exceeding the predetermined speed, the low speed detecting means 38 does not output the low speed signal w. Therefore, the AND gate circuit 39 does not output the actuating signal D whether the power steering unit 5 is in operation or not. In the absence of the actuating signal D, the solenoid valve 24 holds the bypass passage 23 closed. If, however, the engine load is increased by a device other than the power steering unit 5, such as the heater fan, the light, or the cooling fan, the solenoid valve 24 opens the bypass passage 23. Consequently, the engine rpm is increased or kept unchanged in this case, too, and the operations of these devices are maintained in order.

At high speeds, the power steering unit 5 is frequently caused to alternate between its on state and off state. If the engine rpm is controlled so as to closely follow such an alternately changing conditions of the power steering unit, the steering becomes unstable and the driver is provided with an unnatural steering feel. According to the present invention, the engine rpm is not influenced by the power steering unit 5 at high vehicle speeds, so that the steering at high speeds is stabilized and fuel consumption is reduced.

In this embodiment, the steering conditions are estimated by sensing the steering effort, and the pump 9 is controlled in accordance with the sensed steering effort. Other variables, such as angular velocity of the steering wheel 1 and vehicle speed, may be employed to know the steering conditions.

In place of the vehicle speed sensor 34, an engine speed sensing means may be used. In this case, the engine speed sensing means produces a signal indicative of the engine rpm, and the comparator circuit 36 is supplied with a signal corresponding to the sensed engine rpm.

In this way, the present invention can provide an engine idling stabilizing system which is arranged to provide a desirable steering characteristics and to prevent an increase of fuel consumption. The idling stabilizing system of the present invention can be made inexpensively, because there is no need to provide an oil pressure switch which is needed in a conventional idle stabilizing system and causes an increase of manufacturing cost.

What is claimed is:

1. A system for stabilizing idling operation of a vehicular engine, comprising:
   a power steering system comprising a hydraulic power unit for providing power assistance to the steering system of the vehicle, a hydraulic fluid pump for supplying a hydraulic fluid under pressure to the power unit, sensing means for sensing at least one variable indicating steering conditions of the vehicle, and controlling means for generating a driving signal to control the fluid pump in an on/off control mode in accordance with the variable sensed by the sensing means,
   low speed detecting means for generating a low speed signal when an engine rotational speed is below a predetermined speed,
   judging means connected with said controlling means of said power steering system and said low speed detecting means for generating an actuating signal when both of said driving signal and said low speed signal are present, and
   engine rotational speed adjusting means connected with said judging means for increasing the supply of an air fuel mixture to the engine by a predetermined amount when said actuating signal is generated by said judging means.

2. A system according to claim 1, wherein said power steering system further comprises a steering wheel, and said sensing means is for sensing rotation of said steering wheel.

3. A system for stabilizing idling operation of a vehicular engine, comprising:
   a power steering system comprising a hydraulic power unit for providing power assistance to the steering system of the vehicle, a hydraulic fluid pump for supplying a hydraulic fluid under pressure to the power unit, sensing means for sensing at least one variable indicating steering conditions of the vehicle, and controlling means connected with the sensing means for generating a driving signal to control the fluid pump in an on/off control mode in accordance with the variable sensed by the sensing means,
   low speed detecting means for generating a low speed signal when a vehicle speed is below a predetermined speed,
   judging means, connected with said controlling means of said power steering system and said low speed detecting means, for generating an actuating signal when both of said driving signal and said low speed signal are present, and
   engine rotational speed adjusting means, connected with said judging means, for increasing the supply of an air fuel mixture to the engine by a predetermined amount when said actuating signal is generated by said judging means.

4. A system according to claim 3, wherein said engine rotational speed adjusting means comprises a bypass passage means for allowing an air fuel mixture to bypass a throttle valve for an intake air flow control of the engine, and a valve disposed in the bypass passage for opening and closing the bypass passage.

5. A system according to claim 3, wherein said variable indicating steering conditions of the vehicle is a steering effort applied on the steering wheel of the vehicle.

6. A system according to claim 3, wherein said power steering system further comprises a steering wheel, and said sensing means is for sensing rotation of said steering wheel.

* * * * *